United States Patent
Mizoguchi

(10) Patent No.: US 8,453,054 B2
(45) Date of Patent: May 28, 2013

(54) DATA PROCESSING APPARATUS, IMAGE DISPLAY METHOD, AND RECORDING MEDIUM FOR PREVIEW DISPLAY OF DOCUMENT DATA

(75) Inventor: Yoshihiro Mizoguchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/193,926

(22) Filed: Jul. 29, 2011

(65) Prior Publication Data

US 2012/0036432 A1 Feb. 9, 2012

(30) Foreign Application Priority Data

Aug. 3, 2010 (JP) ................................ 2010-174713

(51) Int. Cl.
*G06F 17/28* (2006.01)
*G06F 17/27* (2006.01)

(52) U.S. Cl.
USPC ......................................... 715/274; 715/273

(58) Field of Classification Search
USPC .................................................. 715/273, 274
See application file for complete search history.

(56) References Cited

U.S. PATENT DOCUMENTS

| | | | | |
|---|---|---|---|---|
| 8,310,705 B2* | 11/2012 | Ogino et al. | ................. | 358/1.15 |
| 2007/0109581 A1 | 5/2007 | Saitoh | | |
| 2008/0104516 A1* | 5/2008 | Lee | ............................. | 715/732 |
| 2008/0231914 A1 | 9/2008 | Motoyoshi | | |
| 2008/0297812 A1* | 12/2008 | Watanabe | ..................... | 358/1.9 |
| 2009/0132075 A1* | 5/2009 | Barry | ............................. | 700/94 |
| 2010/0027059 A1* | 2/2010 | Ebi | ............................. | 358/1.15 |
| 2010/0088645 A1 | 4/2010 | Zhang et al. | | |
| 2010/0118338 A1* | 5/2010 | Sakiyama et al. | ........... | 358/1.15 |
| 2010/0134835 A1* | 6/2010 | Hasegawa | ................... | 358/1.15 |
| 2010/0149589 A1* | 6/2010 | Hayashi et al. | .............. | 358/1.15 |
| 2010/0218093 A1* | 8/2010 | Sakamoto | ..................... | 715/274 |
| 2011/0167353 A1* | 7/2011 | Grosz et al. | .................. | 715/738 |

FOREIGN PATENT DOCUMENTS

| | | |
|---|---|---|
| JP | 2006-203874 A | 8/2006 |
| JP | 2007-157121 | 6/2007 |
| JP | 2008-236539 A | 10/2008 |
| JP | 2009-239495 A | 10/2009 |
| JP | 2010-039074 A | 2/2010 |
| JP | 2010-052292 | 3/2010 |
| JP | 2010-062710 A | 3/2010 |
| JP | 2010-093535 A | 4/2010 |

* cited by examiner

*Primary Examiner* — Doug Hutton, Jr.
*Assistant Examiner* — Soumya Dasgupta
(74) *Attorney, Agent, or Firm* — Renner, Otto, Boisselle & Sklar, LLP

(57) ABSTRACT

An apparatus and method for generating image data for preview images and displaying the preview images based on the generated image data. Each preview image corresponding to a respective page of document data having a plurality of pages. The displaying of the preview image based on the generated image data is started before the generation of the image data for the preview image for all the pages is completed. Then, an instruction of a process regarding at least one of the displayed preview images is accepted and the process is executed, before the displaying of all of the preview images is completed.

14 Claims, 12 Drawing Sheets

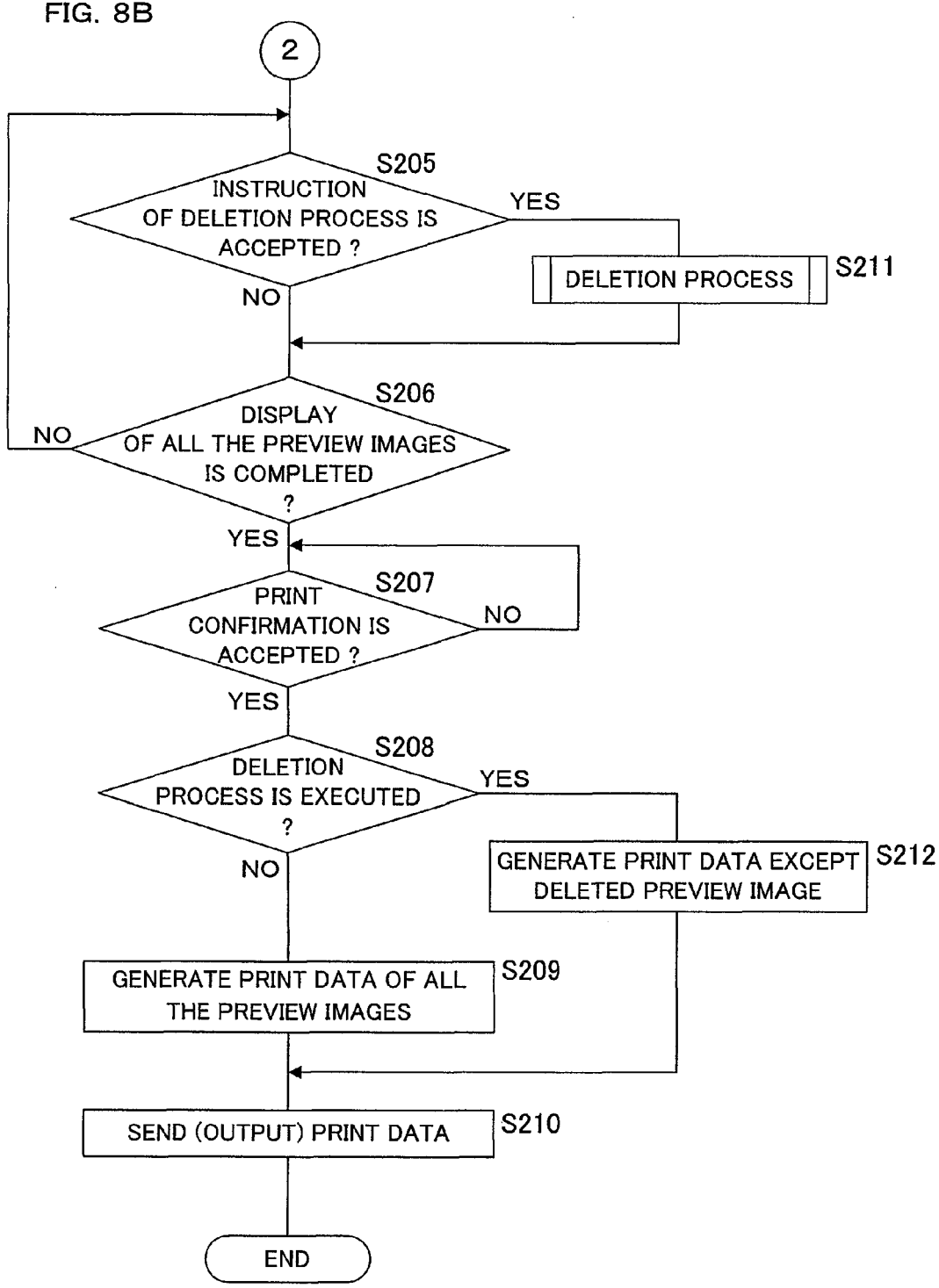

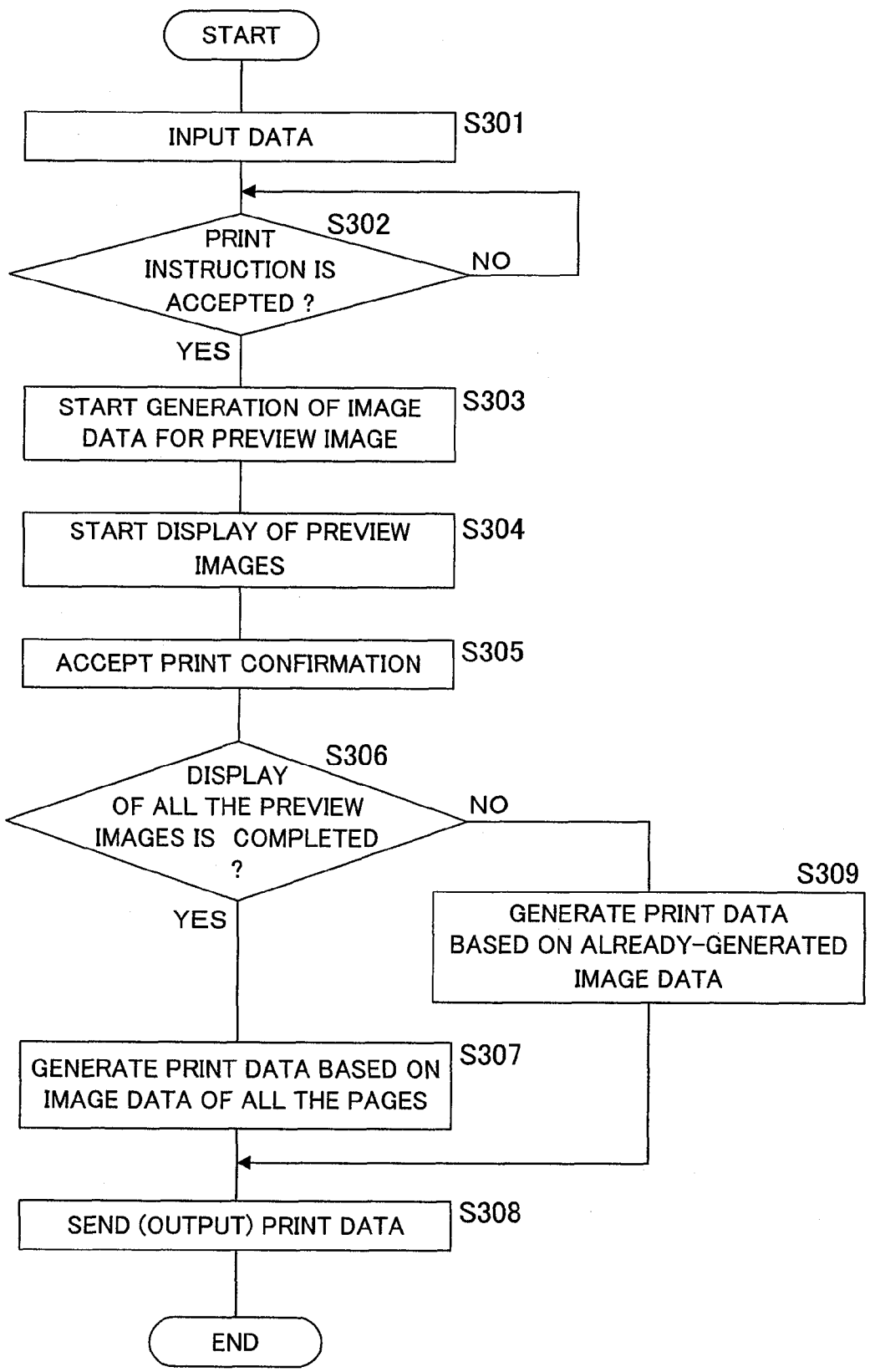

DATA PROCESSING APPARATUS, IMAGE DISPLAY METHOD, AND RECORDING MEDIUM FOR PREVIEW DISPLAY OF DOCUMENT DATA

CROSS-REFERENCE TO RELATED APPLICATIONS

This Nonprovisional application claims priority under 35 U.S.C. §119(a) on Patent Application No. 2010-174713 filed in Japan on Aug. 3, 2010, the entire contents of which are hereby incorporated by reference.

BACKGROUND

1. Technical Field

The present invention relates to a data processing apparatus, an image display method, and a recording medium in which a computer program is recorded, for displaying a preview image.

2. Description of Related Art

For example, in order to output document data such as text and image created by a creator on an application activated in a personal computer, through an image forming apparatus such as a printer and a multi-function machine, a printer driver is installed in the personal computer.

Moreover, the so-called preview function is in widespread use, and in the preview function, the form of an output to be outputted from a printer is displayed on a display section of a personal computer using such a printer driver so that a creator is able to confirm the output in advance on a screen of the display section.

On the other hand, a patent document (refer to Japanese Patent Application Laid-Open No. 2007-157121) discloses an information processing apparatus that saves inputted document data as intermediate data, and displays a preview image on a display section based on the saved document data.

SUMMARY

However, there is a problem in which a spool function of an operating system (OS) is generally used when a preview image is displayed, therefore, a preview image cannot be displayed until a process of all the pages of a document (for example, generation and save of intermediate data) is completed, and an instruction of a process for a preview image such as edit and print of the preview image cannot be performed until the preview image display for all the pages is completed, and thereby a user is kept waiting by the execution start of the process and discomfort is given to a user.

Also, the above-described problem cannot be solved since the information processing apparatus disclosed in the above-described patent document is configured to, when displaying a preview image, generate drawing data for display (intermediate data) for each page of inputted document data, wait for completion of generation of the drawing data of the last page, and then start a preview image display.

The present invention has been made with the aim of solving the above problems, and it is an object of the invention to provide a data processing apparatus, an image display method, and a recording medium in which a computer program is recorded, which when generating image data for preview image corresponding to document data for each page and displaying preview images based on the generated image data, start a preview image display based on the already-generated image data before the image data generation for all the pages is completed, and accept an instruction of a process for the preview image and execute the process before the preview image display for all the pages is completed, and are thereby capable of executing a process concerning the accepted instruction even before the preview image display for all the pages is completed.

The data processing apparatus according to the present invention is a data processing apparatus for generating image data for preview image corresponding to document data of a plurality of pages, for each page, and displaying preview images based on the generated image data, comprising: an image display section for starting a preview image display based on the already-generated image data before the image data generation for all the pages is completed; and an instruction accepting section for accepting an instruction of a process for the preview image before the preview image display for all the pages is completed, wherein the process concerning the instruction accepted by the instruction accepting section is executed before the preview image display for all the pages is completed.

In the present invention, before the image data generation for preview image corresponding to all the pages of the document data is completed, the image display section starts the preview image display based on the already-generated image data. Even before the display of the preview images by the image display section is completed, the instruction accepting section accepts an instruction of a process for the preview image (for example, edit and print, etc. of the preview image), and before the display of the preview images of all the pages is completed, the process concerning the instruction accepted by the instruction accepting section is executed.

The data processing apparatus according to the present invention is characterized in that the image display section displays preview images in the sequence of the pages, and the data processing apparatus further comprises a stop instruction accepting section for accepting a stop instruction to stop the preview image display before said preview image display for all the pages is completed, and wherein when the stop instruction accepting section accepts the stop instruction, the image display section stops the preview image display of a page following the page of which preview image is already displayed.

In the present invention, when the stop instruction accepting section accepts the stop instruction before the display of the preview images corresponding to all the pages of the document data is completed, the image display section does not display the preview image of the page following the page of the already-displayed preview image.

The data processing apparatus according to the present invention is characterized by further comprising a restart instruction accepting section for accepting a restart instruction to restart the preview image display when said preview image display is stopped, and wherein when the restart instruction accepting section accepts the restart instruction, the image display section restarts the preview image display of the page following the page of which preview image is already displayed.

In the present invention, when the restart instruction accepting section accepts the restart instruction while the display of the preview images is being stopped, the image display section restarts the display of the preview image of the page following the page of the already-displayed preview image.

The data processing apparatus according to the present invention is characterized by further comprising an edit instruction accepting section for accepting an edit instruction to edit the already-displayed preview image before the preview image display for all the pages is completed, and wherein a process concerning the instruction accepted by the edit instruction accepting section is executed before the preview image display for all the pages is completed.

In the present invention, since the edit instruction accepting section accepts the edit instruction before the display of the preview images corresponding to all the pages of the document data is completed, execution of the process concerning the instruction accepted by the edit instruction accepting section can be started even before the display of the preview images corresponding to all the pages is completed.

The data processing apparatus according to the present invention is characterized by further comprising: a formation instruction accepting section for accepting an image formation instruction of the document data before the preview image display for all the pages is completed; a generating section for starting an image forming data generation based on the already-generated image data for preview image when the formation instruction accepting section accepts the image formation instruction; and an output section for outputting the image forming data generated by the generating section.

In the present invention, when the formation instruction accepting section accepts the image formation instruction before the display of the preview images corresponding to all the pages of the document data is completed, the generating section starts generation of image forming data based on the already-generated image data for preview image even before the display of the preview images corresponding to all the pages is completed. Moreover, even before the display of the preview images corresponding to all the pages is completed, the output section outputs the image forming data generated by the generating section to, for example, an external image forming apparatus, and thereby image formation is performed.

The data processing apparatus according to the present invention is characterized in that when a plurality of preview images are already displayed and the edit instruction accepting section accepts an edit instruction to delete parts of the already-displayed preview images, the image display section deletes the parts from the already-displayed preview images, and the generating section generates image forming data based on an image data for preview image except the image data for preview image corresponding to the parts of the already-displayed preview images.

In the present invention, when the edit instruction accepting section accepts an edit instruction to delete a part of the already-displayed preview images, the part of preview images is deleted from the already-displayed preview images, and the generating section generates image forming data based on the image data for preview image except the image data for preview image corresponding to the part of preview images, and the output section outputs the generated image forming data to, for example, an external image forming apparatus.

The image display method according to the present invention is an image display method for displaying preview images corresponding to document data of a plurality of pages, comprising: a step for generating image data for preview image corresponding to the document data for each page; a step for starting a preview image display based on the already-generated image data before generation of the image data of all the pages is completed; an instruction accepting step for accepting an instruction of a process for the preview image before display of the preview images of all the pages is completed; and a step for executing the process concerning the instruction accepted at the instruction accepting step before display of the preview images of all the pages is completed.

The recording medium according to the present invention is a computer-readable recording medium in which a computer program for causing a computer to display preview images corresponding to document data of a plurality of pages is recorded, said computer program comprising: a step for causing the computer to generate image data for preview image corresponding to the document data for each page; a step for causing the computer to start a preview image display based on the already-generated image data before generation of the image data of all the pages is completed; an instruction accepting step for causing the computer to accept an instruction of a process for the preview image before display of the preview images of all the pages is completed; and a step for causing the computer to execute the process concerning the instruction accepted at the instruction accepting step before display of the preview images of all the pages is completed.

In the present invention, before generation of the image data for preview image corresponding to all the pages of the document data is completed, the preview image display based on the already-generated image data is started. Even before the display of the preview images corresponding to all the pages of the document data is completed, an instruction of the process for the preview image (for example, edit and print, etc. of the preview image) is accepted, and the process concerning the accepted instruction is executed before the display of the preview images corresponding to all the pages is completed.

In the present invention, the above-described computer program is recorded on the recording medium. A computer reads the computer program from the recording medium, and the above-described data processing apparatus and image display method are realized by the computer.

According to the present invention, before the preview image display corresponding to all the pages of document data is completed, an instruction of a process for a preview image is accepted and the process concerning the accepted instruction can be executed, and even before the display of all the preview images is completed, a user is not kept waiting by execution of the process, and thereby discomfort is not given to a user.

The above and further objects and features will more fully be apparent from the following detailed description with accompanying drawings.

BRIEF DESCRIPTION OF THE SEVERAL VIEWS OF THE DRAWINGS

FIG. 8B is a flow chart explaining print of preview images in the personal computer according to Embodiment 1 of the present invention.

FIG. 9 is a flow chart explaining a print process for preview images in the personal computer according to Embodiment 1 of the present invention.

DETAILED DESCRIPTION

The following description will explain an example in which a personal computer is applied to a data processing apparatus, an image display method, and a computer program according to Embodiment of the present invention.

Embodiment 1

Figure 1:
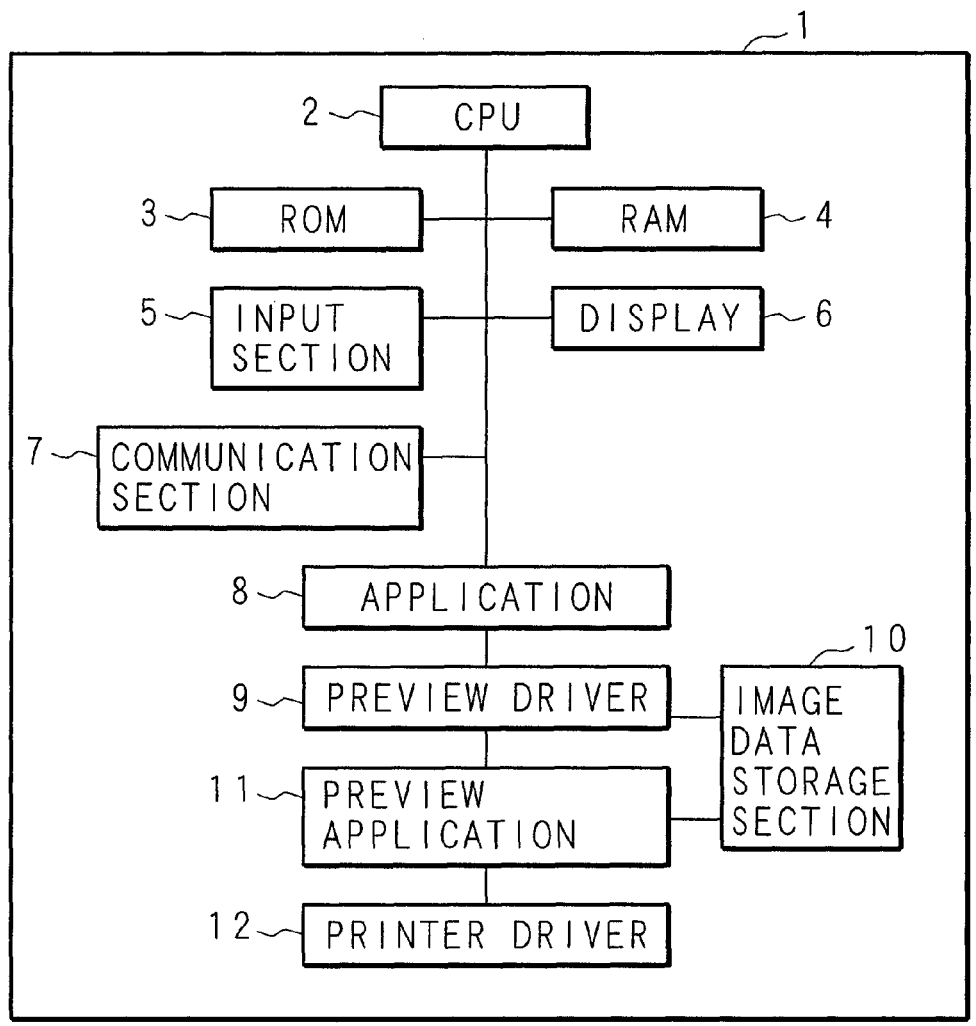
FIG. 1 is a functional block diagram explaining an essential configuration of a personal computer according to Embodiment 1 of the present invention.

FIG. 1 is a functional block diagram explaining an essential configuration of a personal computer 1 according to Embodiment 1 of the present invention. For example, a personal computer 1 is connected to a multi-function machine (not shown) with a LAN, and the multi-function machine forms an image based on data for a document (document data), which is created by the personal computer 1. At this time, a user causes the personal computer 1 to display a preview image of the document, and confirms a printed matter in advance.

The personal computer 1 uses, for example, the Microsoft Windows (registered trademark) operating system (OS) available from Microsoft (registered trademark) Corporation. The personal computer 1 comprises: a CPU 2; a ROM 3; a RAM 4; an application 8; a preview driver 9; a preview application 11; a printer driver 12; an input section 5; a display 6; a communication section 7; and an image data storage section 10.

The ROM 3 stores various kinds of control programs, and text data for a later-described notification, etc. in advance, and the RAM 4 is capable of storing data temporarily and allows the data to be read regardless of the order, position etc. in which they are stored. The RAM 4 stores, for example, a program read from the ROM 3, various kinds of data generated by execution of the program, and various kinds of data received from external devices. The RAM 4 also stores edited data after edit and a history of a deletion process, as described later.

The CPU 2 controls the above-described various hardware devices by loading on the RAM 4 the control program stored in the ROM 3 in advance and executing it, and operates the whole apparatus as the personal computer 1 according to Embodiment 1 of the present invention.

The application 8 is an application program for providing text editing functions, such as word processing, paint, and presentation functions. Document data created on the application 8 is supplied to the preview driver 9 through an interface of the OS.

The input section 5 comprises, for example, a keyboard, a mouse, etc. Data is inputted through the input section 5 from a user, and document data is created on the application 8.

The display 6 is a liquid crystal display, for example, displays a preview image based on image data for preview image generated by the preview driver 9, and displays a later-described setting accepting screen by the preview application 11. A user can modify display of a preview image displayed on the display 6, as described later.

The communication section 7 includes a network card, a modem, etc. for sending, for example, print data (image forming data) to the multi-function machine.

When the creation of document data on the application 8 is completed and an instruction for printing is accepted from a user, the preview driver 9 is activated and generates image data for preview image (intermediate file) corresponding to the document data. For example, when a document concerning the accepted instruction for printing has a plurality of pages, the preview driver 9 generates, for each page of the document, image data for preview image of the pages in the sequence of the pages.

In detail, the preview driver 9 generates image data for preview image for each page, based on the document data received from the application 8 and information received from the printer driver 12. The image data is EMF (Enhanced Meta File) data excellent in spread possibility, reproducibility, etc., for example, and contains the document data and meta data (paper size, resolution and orientation, etc.) for printing the document data. Moreover, the image data for preview image (intermediate file) is not limited to the EMF data, but may be XPS data. The image data generated by the preview driver 9 is stored into the image data storage section 10.

The preview application 11 (image display section) displays a preview image on the display 6 to assist a user of viewing a printed status of a document, displays a setting accepting screen that is an interface for accepting from a user settings of printing conditions (for example, the number of copies, duplex/single-side printing, multiple pages per sheet printing, scaled printing, etc.) for printing and post-printing processing conditions (such as binding and stapling, etc.), and accepts the settings. Based on the accepted settings, the preview application 11 modifies the image data for preview image, and displays a preview image based on the modified image data on the display 6.

Also, the preview application 11 accepts an edit instruction to edit a preview image, such as arrangement change and partial deletion of preview images displayed on the display 6, edits the preview image and displays it. Moreover, when a plurality of preview images are being displayed, the preview application 11 accepts an instruction to stop the display of the preview images, and stops the display of the preview images.

Therefore, in the present invention, for example, when printing conditions or post-printing processing conditions are modified, a preview image on which not only the printing conditions but also the post-printing processing conditions are reflected is displayed promptly, and thereby the visibility for the user can be improved.

Furthermore, each time a piece of image data is generated by the preview driver 9, the preview application 11 displays a preview image based on the image data on the display 6 in the sequence of the pages. That is, the preview application 11 starts display of the preview image based on the already-generated image data, before generation of the image data of all the pages of the document is completed. Since the preview application 11 also performs edit of the preview image according to the edit instruction based on the already-generated image data, the preview application 11 can edit a preview image, without waiting for completion of display of all the preview images even before the display of all the preview images is completed.

Note that the preview application 11 sends image data of the document (EMF data), the printing conditions and the post-printing processing conditions to the printer driver 12, and gives an instruction to send them to the multi-function machine. For example, when a print instruction of the document is accepted from a user before display of all the preview images is completed, the preview application 11 sends the already-generated image data to the printer driver 12.

The preview application 11 sends the image data (EMF data) to, for example, Win32API which is drawing means provided by the OS, and causes Win32API to execute display and output of the EMF data, in order to display the preview image on the display 6 based on image data generated by the preview driver 9, and also displays the setting accepting screen on the display 6.

Figure 2:
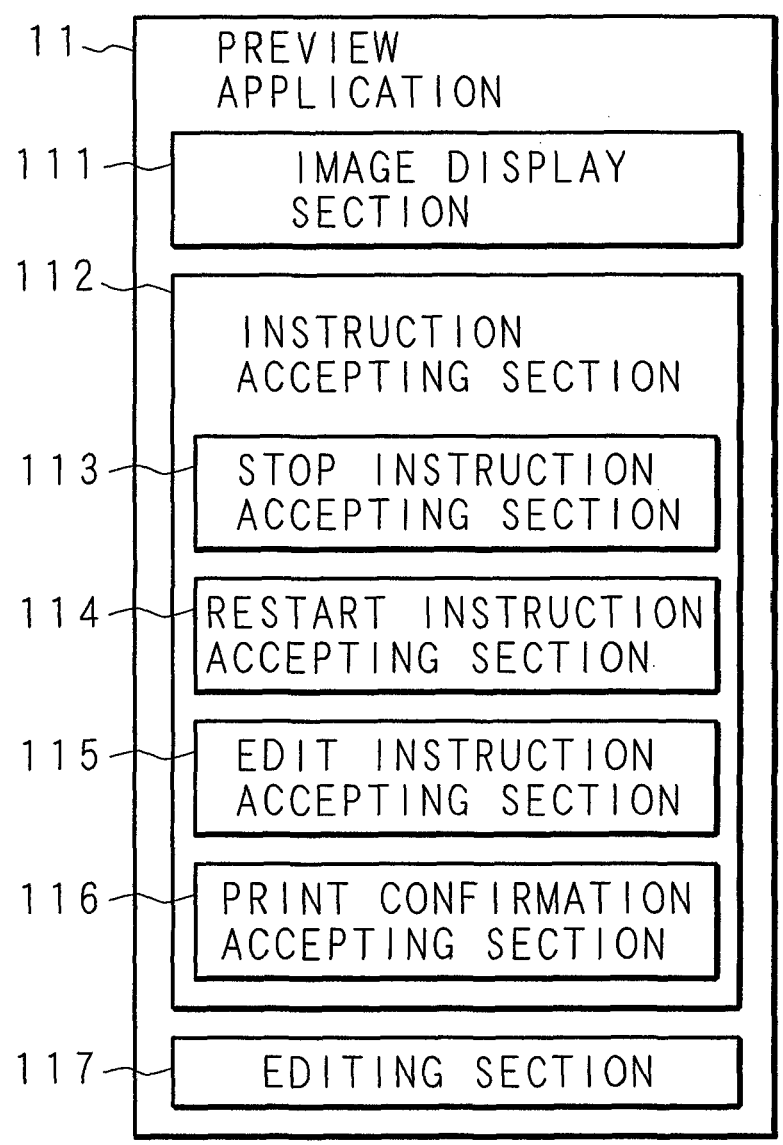
FIG. 2 is a functional block diagram explaining an essential configuration of a preview application in the personal computer according to Embodiment 1 of the present invention.

FIG. 2 is a functional block diagram explaining an essential configuration of the preview application 11 in the personal computer 1 according to Embodiment 1 of the present invention. The preview application 11 includes an image display section 111, an instruction accepting section 112 and an editing section 117.

The image display section 111 displays, as described above, a preview image based on image data generated by the preview driver 9, the setting accepting screen, the edited preview image, later-described text "Under Generation of Preview" and text "Under Stop of Preview Display" and the like.

The instruction accepting section 112 includes a stop instruction accepting section 113, a restart instruction accepting section 114, an edit instruction accepting section 115, and a print confirmation accepting section 116.

The stop instruction accepting section 113 accepts a stop instruction to stop display of the preview images in the middle of the display, through the "Stop of Preview Display" soft key (refer to FIG. 3) located in the setting accepting screen. When the stop instruction accepting section 113 accepts the stop instruction, the image display section 111 does not display preview images of pages following a page of the already-displayed preview image.

For example, suppose that, as an example, while the preview application 11 is displaying preview images of document having 100 pages in the sequence of the pages, the "Stop of Preview Display" soft key is operated by a user when the preview application 11 displays a preview image of the 50th page, and the stop instruction is accepted. Thus, when the stop instruction accepting section 113 accepts the stop instruction, the CPU 2 gives an instruction to stop the preview image display to the image display section 111. At this time, since the preview images up to the 50th page are being already displayed, the image display section 111 does not display preview images of the 51st page and the subsequent pages.

Figure 3:
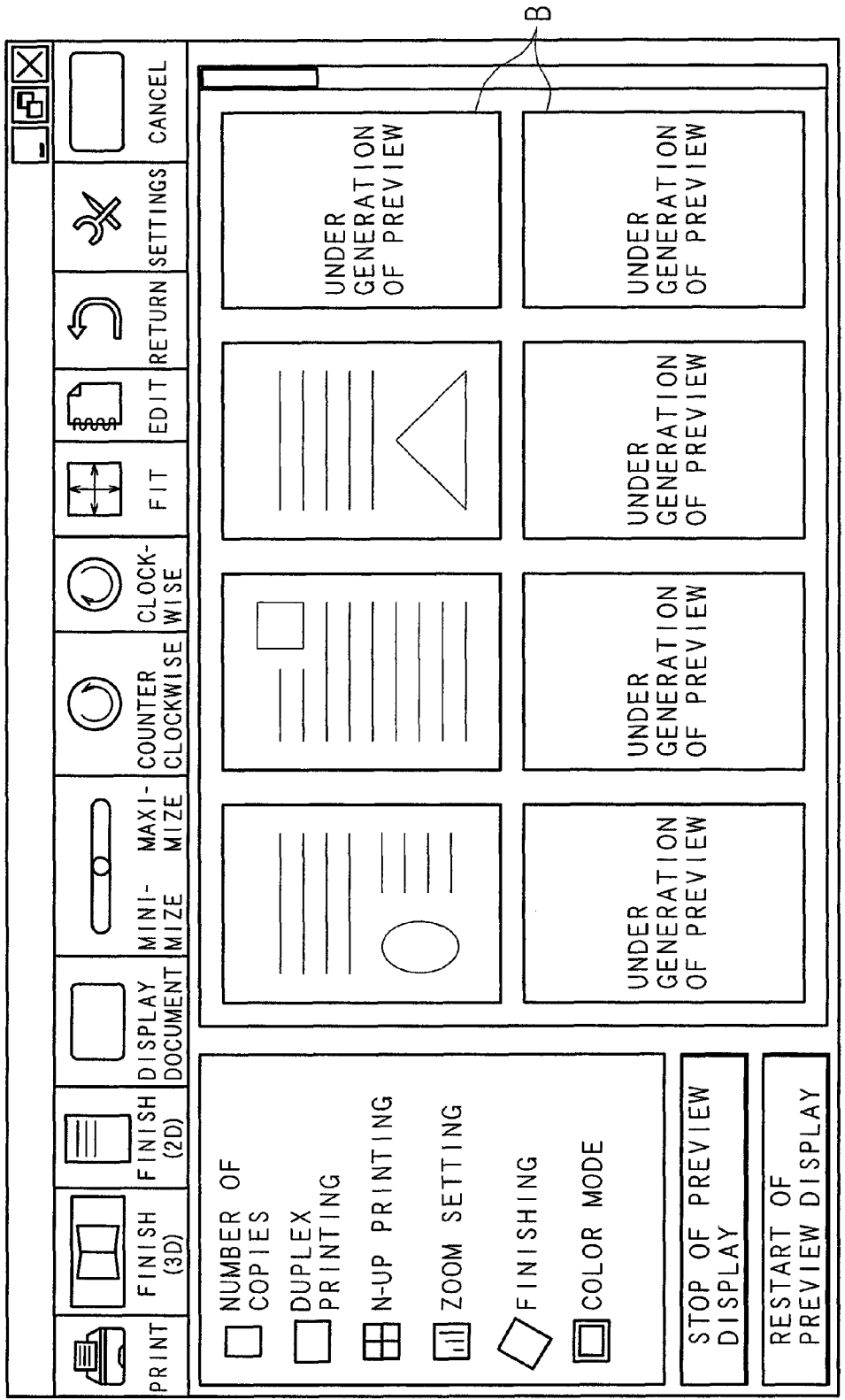
FIG. 3 is an exemplary view showing an example of preview image display in the personal computer according to Embodiment 1 of the present invention.
Figure 4:
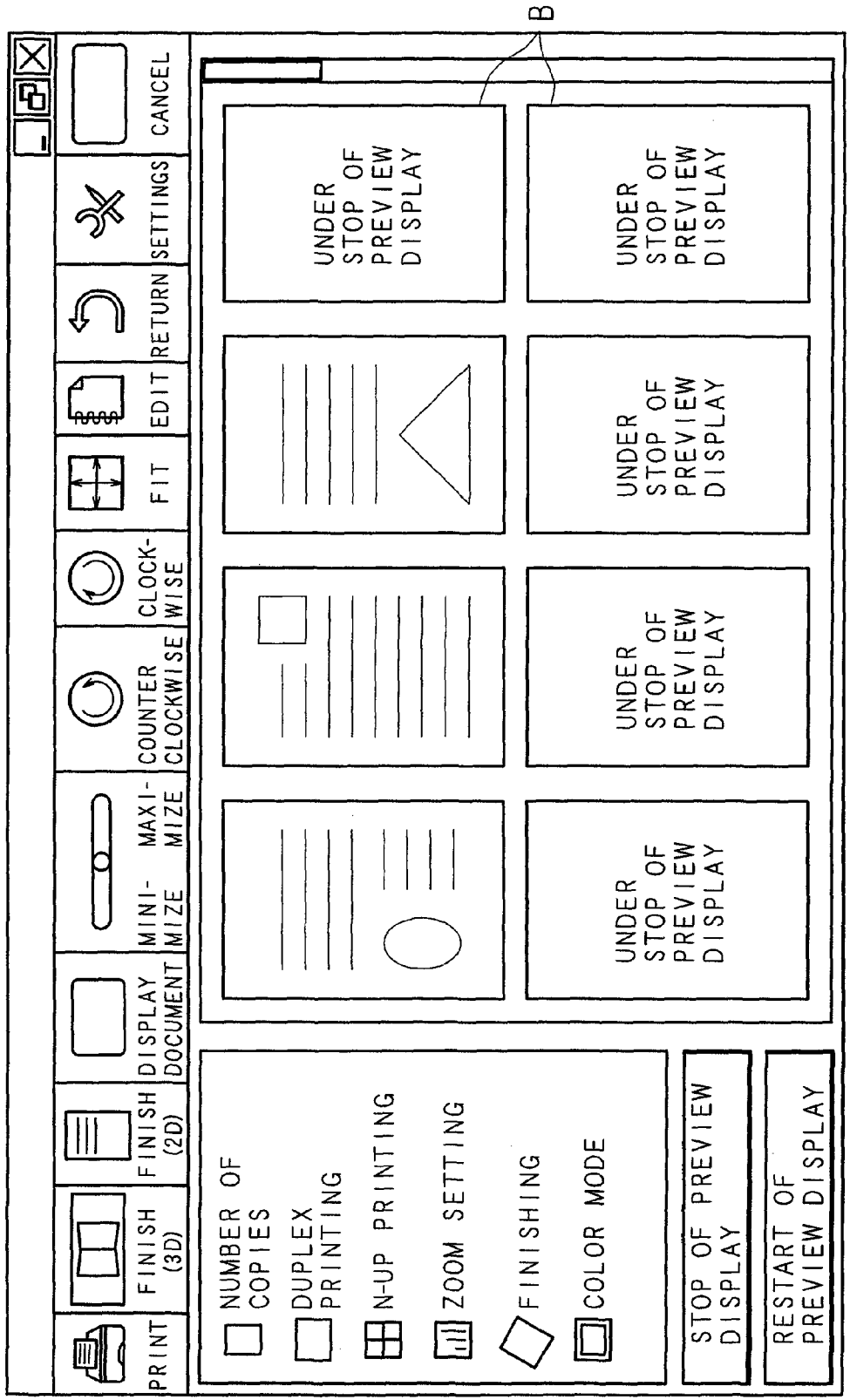
FIG. 4 is an exemplary view showing an example of preview image display in the personal computer according to Embodiment 1 of the present invention.

FIGS. 3 and 4 are exemplary views showing an example of preview image display in the personal computer 1 according to Embodiment 1 of the present invention. First, the image display section 111 displays the setting accepting screen on the display 6, and display frames B for the total number of pages of the document. Subsequently, the image display section 111 displays the text "Under Generation of Preview" in the display frames B, and notifies a user of information that the preview image display is being processed. For example, when image data generation for preview image corresponding to the 1st page of the document is completed, the image display section 111 reads the image data of the 1st page from the image data storage section 10, and displays a preview image of the 1st page on the corresponding display frame B based on the image data. When such a process is repeated and the preview images up to the 3rd page are displayed, as shown in FIG. 3, three preview images are displayed and the text "Under Generation of Preview" is displayed on the other display frames B.

On the other hand, at this time, when a user operates the "Stop of Preview Display" soft key of the setting accepting screen and the stop instruction accepting section 113 accepts a stop instruction, the image display section 111 stops the preview image display of pages following the 3rd page of the document in which the preview image is already displayed, and displays the text "Under Stop of Preview Display" on the display frames B on which preview images are not yet displayed (refer to FIG. 4). Therefore, it is possible to notify a user of information that the preview image display is being stopped, and information that from what page the display of the preview images is being stopped.

The restart instruction accepting section 114 accepts a restart instruction to restart the stopped display of the preview images through a "Restart of Preview Display" soft key (refer to FIG. 3) located in the setting accepting screen. When the restart instruction accepting section 114 accepts the restart instruction, the image display section 111 restarts the preview image display of pages following the pages of the already-displayed preview images.

For example, suppose that as an example, as described above, when the display of the preview images is being stopped in a condition where the preview images up to the 50th page in the document of 100 pages are displayed, the "Restart of Preview Display" soft key is operated by a user, and the restart instruction accepting section 114 accepts the restart instruction. Thus, when the restart instruction accepting section 114 accepts the restart instruction, the CPU 2 gives an instruction to restart the display of the preview images to the image display section 111. At this time, since the preview images up to the 50th page are already displayed, the image display section 111 restarts the preview image display of the 51st page and the subsequent pages.

The edit instruction accepting section 115 accepts an edit instruction to edit the already-displayed preview images through an "Edit" soft key (refer to FIG. 3) located in the setting accepting screen. For example, the "Edit" soft key has a "Deletion" soft key as a sub menu, and when the "Deletion" soft key is operated by a user, the edit instruction accepting section 115 accepts an edit instruction to delete a part of the displayed preview images (deletion process). A scroll bar is located in the setting accepting screen, and when a user operates the scroll bar laterally in a plan view of the drawing, the edit instruction accepting section 115 performs a visual process such that preview images are turned over one by one, for example, and accepts an edit instruction to display other preview images in addition to the already-displayed preview images (turn-over process).

The print confirmation accepting section 116 (formation instruction accepting section) accepts a print confirmation for confirming print of the documents corresponding to the preview images displayed before and after edit through a "Print" soft key (refer to FIG. 3) located in the setting accepting screen. When a user operates the "Print" soft key of the setting accepting screen, the print confirmation accepting section 116 accepts the print confirmation (image formation instruction), and the EMF data is sent to the printer driver 12 by the preview application 11 (for example, when printing conditions and post-printing processing conditions are accepted through the setting accepting screen, together with the accepted printing conditions and post-printing processing conditions).

The editing section 117 edits the already-displayed preview images according to an edit instruction, such as interchange of pages, in addition to the deletion process and the turn-over process accepted by the edit instruction accepting section 115. The edited data after edit is temporarily stored in the RAM 4, and the image display section 111 displays an image based on the edited data on the display 6.

Figure 5:
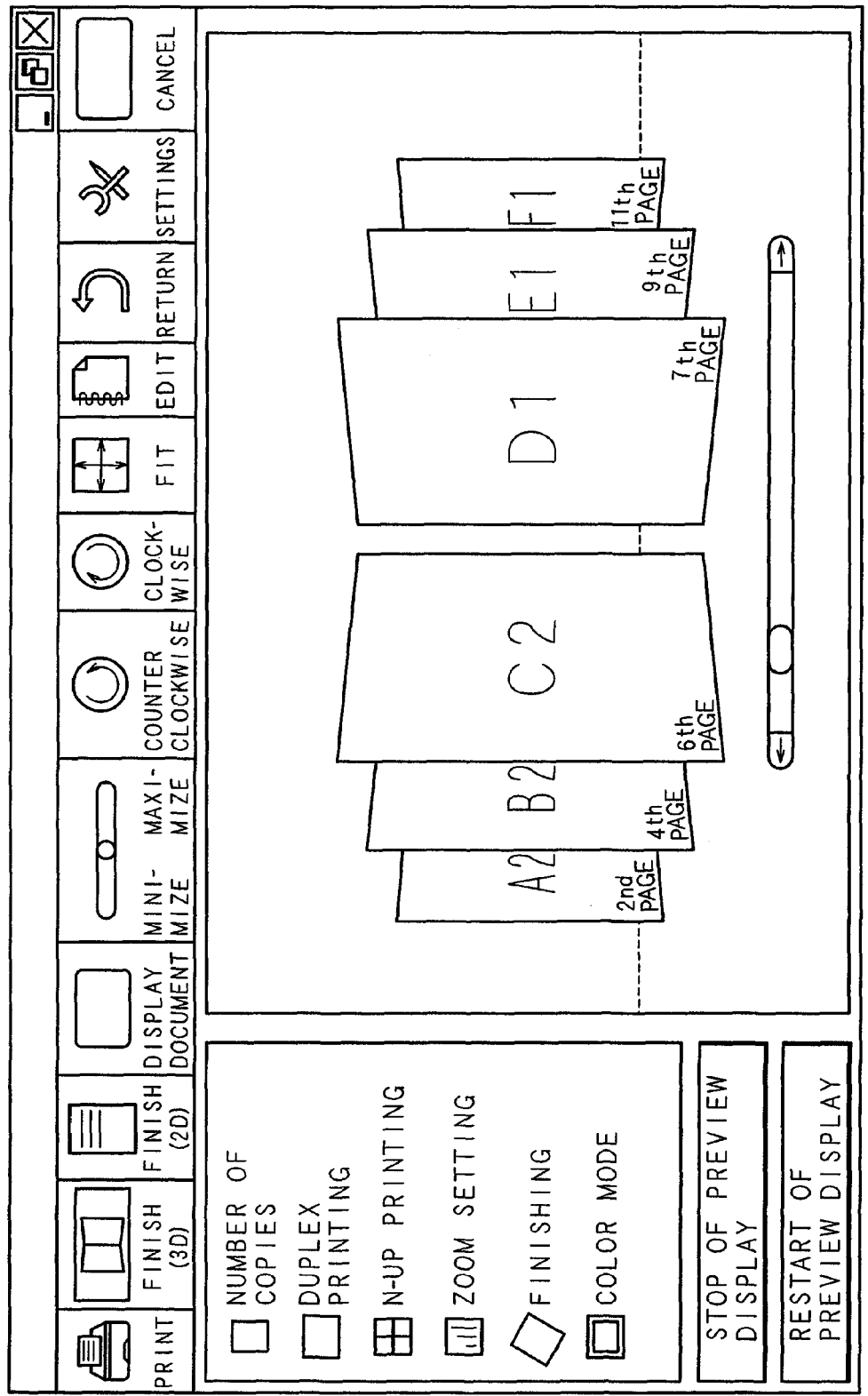
FIG. 5 is an exemplary view showing a display example of preview images before execution of a turn-over process in the personal computer according to Embodiment 1 of the present invention.
Figure 6:
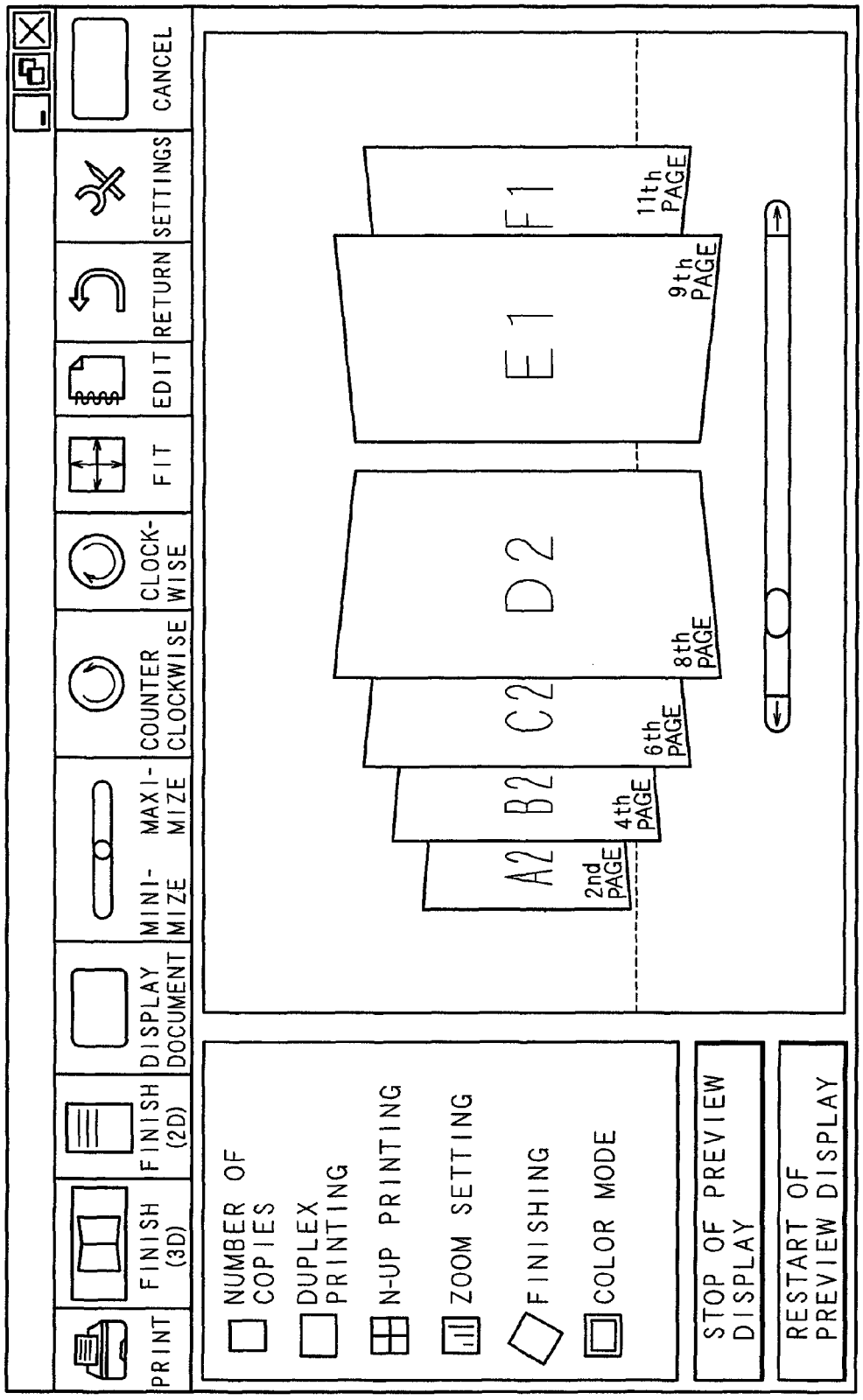
FIG. 6 is an exemplary view showing a display example of preview images after execution of the turn-over process in the personal computer according to Embodiment 1 of the present invention.

FIG. 5 is an exemplary view showing a display example of preview images before execution of the turn-over process in the personal computer 1 according to Embodiment 1 of the present invention, and FIG. 6 is an exemplary view showing a display example of preview images after execution of the turn-over process in the personal computer 1 according to Embodiment 1 of the present invention. For convenience of description, a case is explained as an example, in which duplex printing is performed and each preview image is displayed in three dimensions.

For example, although 2 pages (the 6th page (back side) and the 7th page (front side)) are fully opened before the edit instruction accepting section 115 accepts an edit instruction to execute the turn-over process, when a user operates the scroll bar and the edit instruction accepting section 115 accepts an edit instruction to execute the turn-over process for displaying the subsequent 2 pages, the editing section 117 creates data in which the 8th page (back side) and the 9th page (front side) are fully opened. The image display section 111 displays on the display 6 an image in which the 8th page and the 9th page are fully opened as shown in FIG. 6, based on the created data.

The printer driver 12 converts the EMF data (intermediate file) acquired from the preview application 11 into data of a form (PCL) capable of being processed for printing by the multi-function machine, generates data for printing (image forming data), and transmits the data for printing (hereinafter referred to as print data) to the multi-function machine. The multi-function machine receives the PCL-form print data, and prints an image based on the document data on a sheet according to the printing conditions and the post-printing processing conditions.

Also when the print instruction of the document is accepted from a user and the preview application 11 sends the already-generated image data to the printer driver 12, before the display of all the preview images is completed, since the generation of the print data is promptly performed, the communication section 7 transmits (outputs) the generated print data to the multi-function machine (external device), and the multi-function machine receives the print data and performs a print process, before the display of all the preview images is completed, the print can be started even before the display of all the preview images is completed.

Figure 7A:
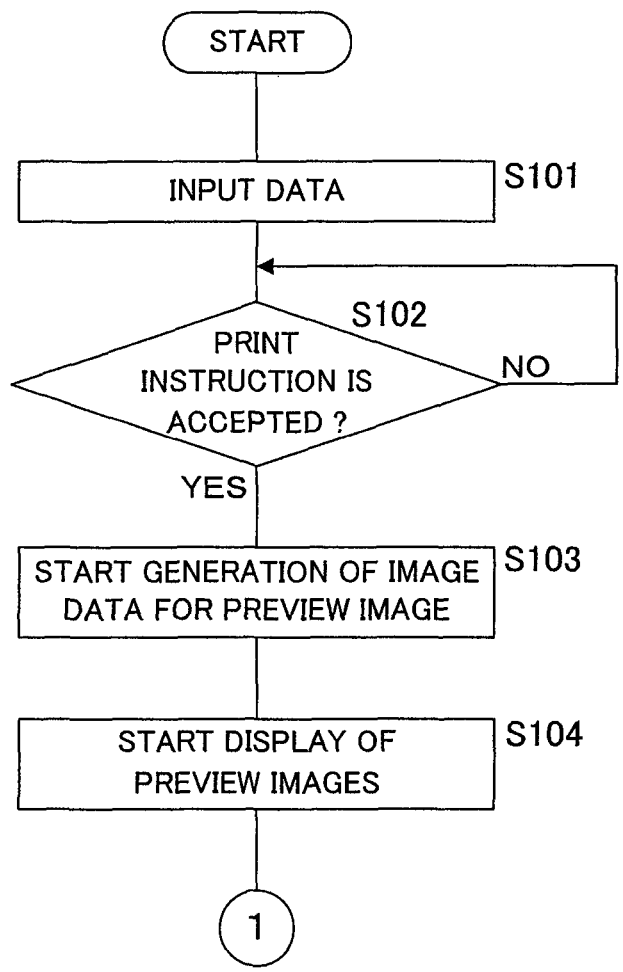
FIG. 7A is a flow chart explaining a preview image display in the personal computer according to Embodiment 1 of the present invention.
Figure 7B:
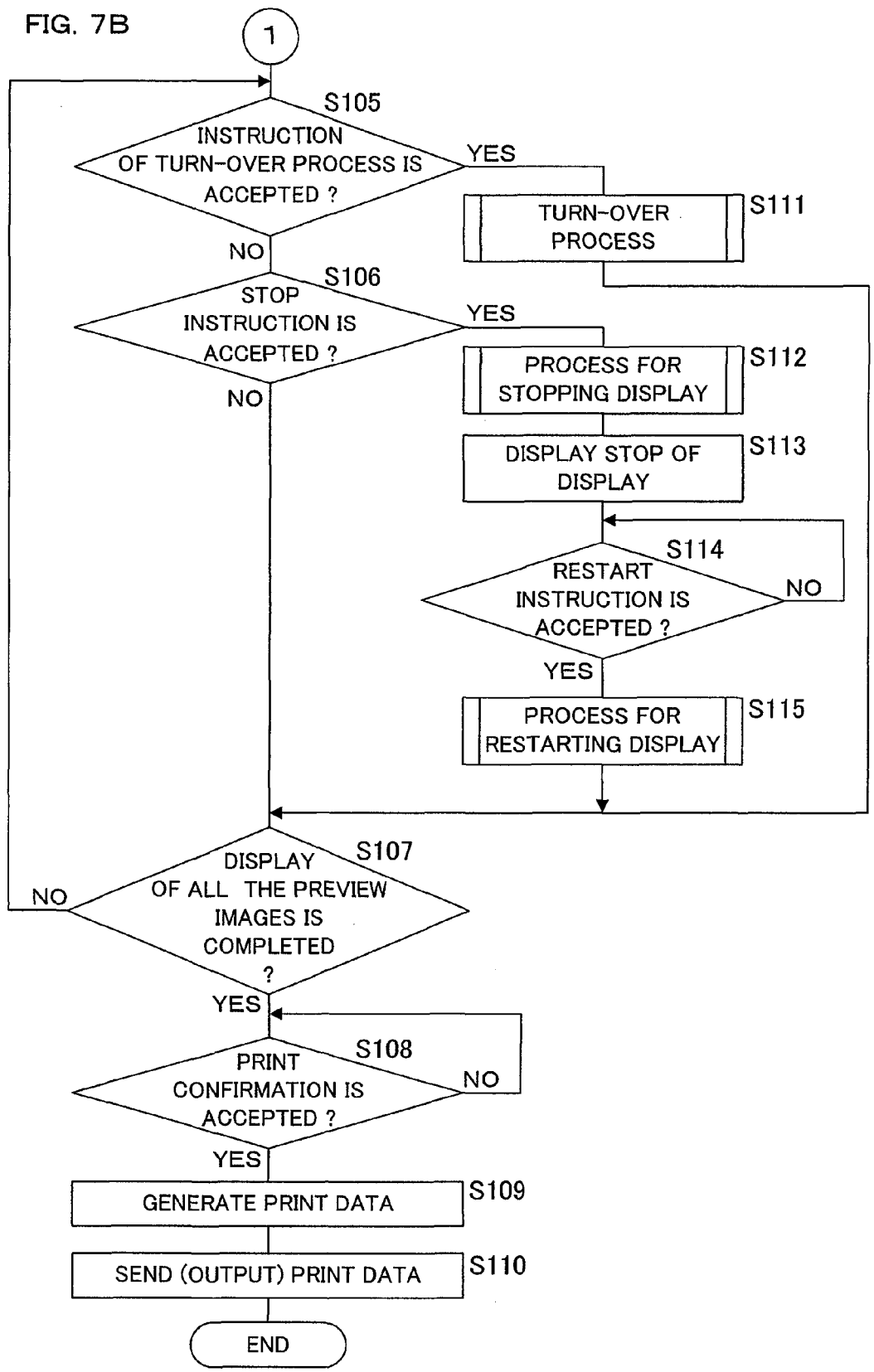
FIG. 7B is a flow chart explaining the preview image display in the personal computer according to Embodiment 1 of the present invention.

FIGS. 7A and 7B are flow charts explaining preview image display in the personal computer 1 according to Embodiment 1 of the present invention. For convenience of description, a case is explained as an example, in which a document has a plurality of pages, and before the display of all the preview images is completed, the edit of the turn-over process and the display stop of preview images are performed, and print of the preview image after edit is performed through the corresponding multi-function machine.

For example, when a user operates the input section 5 of the personal computer 1, data is inputted through the input section 5 (Step S101). Based on the inputted data, a document is created on the application 8.

The CPU 2 determines whether or not a print instruction of the document is accepted based on a signal from the input section 5, coordinates on the screen of the display 6, etc. (Step S102). For example, a "Print" soft key is located in a predetermined position on the screen, and the CPU 2 monitors an operation of the "Print" soft key based on the signal from the input section 5 and the coordinates on the screen of the display 6, etc.

Since the "Print" soft key is not operated when a user is still creating the document, the CPU 2 determines that a print instruction of the document is not accepted (Step S102: NO), and waits until the print instruction is accepted.

On the other hand, when the user finishes the creation of the document and operates the "Print" soft key using, for example, a mouse, to give an instruction to print the document, the CPU 2 determines that the print instruction of the document is accepted (Step S102: YES), and the preview driver 9 is activated.

The preview driver 9 starts generation, for each page, of the image data for preview image (EMF data) of the document, based on the document data received from the application 8 and the information received from the printer driver 12 (Step S103). The EMF data contains the document data and the metadata for printing the document. The generated image data is stored in the image data storage section 10. At this time, the preview application 11 is activated and the setting accepting screen is displayed on the display 6.

The preview application 11 (image display section 111) starts the preview image display on the display 6, based on the image data for preview image generated by the preview driver 9 with the above-described method (Step S104). That is, the preview image display is sequentially performed based on the already-generated image data for preview image, without waiting for generation of the image data for preview image of all the pages of the document.

Subsequently, the CPU 2 monitors the edit instruction accepting section 115 of the instruction accepting section 112 to determine whether or not an edit instruction (for example, an instruction of the turn-over process) is accepted (Step S105).

When a user operates the scroll bar of the setting accepting screen and the edit instruction accepting section 115 accepts the instruction of the turn-over process, the CPU 2 determines that the instruction of the turn-over process is accepted (Step S105: YES), and the above-described turn-over process is executed (Step S111). That is, the CPU 2 gives an instruction to edit the displayed preview image (turn-over process) to the editing section 117, and the editing section 117 edits image data of the displayed preview image according to the instruction of the CPU 2. Subsequently, the image display section 111 displays the preview image based on the edited data after edit on the display 6. Thereafter, the processing proceeds to Step S107.

On the other hand, when a user does not operate the scroll bar of the setting accepting screen and the edit instruction accepting section 115 does not accept an instruction of the turn-over process, the CPU 2 determines whether or not the instruction of the turn-over process is not accepted (Step S105: NO), and then monitors the stop instruction accepting section 113 to determine whether or not a stop instruction to stop the display of the preview images is accepted (Step S106).

When a user operates the "Stop of Preview Display" soft key of the setting accepting screen and the stop instruction accepting section 113 accepts the stop instruction, the CPU 2 determines that the stop instruction is accepted (Step S106: YES), and executes the above-described process for stopping the display (Step S112). That is, the CPU 2 gives an instruction to the image display section 111, the image display section 111 stops the display of the preview images in the middle of the display according to the instruction from the CPU 2, does not display preview images of pages following the pages of the already-displayed preview images.

Subsequently, as described above, the image display section 111 displays the text "Under Stop of Preview Display" on the display frames B (Step S113), and notifies a user that the display of the preview images is being stopped (refer to FIG. 4).

Thereafter, the CPU 2 monitors the restart instruction accepting section 114 to determine whether or not a restart instruction to restart the stopped display of the preview images is accepted (Step S114).

When the CPU 2 determines that the restart instruction is not accepted (Step S114: NO), it waits until it determines that the restart instruction is accepted, i.e., until the restart instruction accepting section 114 accepts the restart instruction through the "Restart of Preview Display" soft key of the setting accepting screen.

On the other hand, when the CPU 2 determines that the restart instruction is accepted (Step S114: YES), it executes the above-described process for restarting the display (Step S115). That is, the CPU 2 gives an instruction to the image display section 111, and the image display section 111 restarts the display of the preview images of the pages following the pages of the already-displayed preview images, according to the instruction from the CPU 2. Thereafter, the processing proceeds to Step S107.

When the CPU 2 determines that the stop instruction is not accepted at Step S106 (Step S106: NO), the CPU 2 determines whether or not the display of all the preview images is completed, based on the total number of pages of the document (Step S107).

When the CPU 2 determines that the display of all the preview images is not completed (Step S107: NO), it returns the processing to Step S105.

When the CPU 2 determines that the display of all the preview images is completed (Step S107: YES), it monitors the print confirmation accepting section 116 to determine whether or not the print confirmation for confirming the print of the document corresponding to the preview images displayed before and after edit is accepted (Step S108).

For example, when a user does not operate the "Print" soft key located in the setting accepting screen, and the CPU 2 determines that the print confirmation is not accepted (Step S108: NO), the CPU 2 waits until it determines that the print confirmation is accepted, i.e., until the print confirmation accepting section 116 accepts the print confirmation through the "Print" soft key of the setting accepting screen.

On the other hand, for example, when the user confirms the print of the document corresponding to the preview images displayed after edit and operates the "Print" soft key of the setting accepting screen, the CPU 2 determines that the print confirmation is accepted (Step S108: YES), and gives to the preview application 11 an instruction to send the EMF data (intermediate file) to the printer driver 12.

For example, after the preview images are displayed on the setting accepting screen, when the user suitably operates soft buttons of the setting accepting screen on left side in plan view of the drawing (refer to FIG. 3) to set printing conditions and post-printing processing conditions, the EMF data contains the document data, the metadata for printing the document data, the printing conditions, and the post-printing processing conditions.

After the printer driver 12 acquired the EMF data from the preview application 11, it converts the EMF data into PCL-form print data so that the corresponding multi-function machine recognizes the print data, to generate the print data (Step S109).

Next, the printer driver 12 sends the PCL-form print data to the multi-function machine through the communication section 7 (Step S110).

Therefore, as described above, even before the display of the preview images of all the pages of the document is completed, a predetermined process (edit process) for preview images, such as the turn-over process and the deletion process, can be executed.

A case is explained as an example below, in which when the edit instruction of the deletion process for deleting a part of the already-displayed preview images is accepted, the deletion process is executed and after the deletion process the print is performed.

Figure 8A:
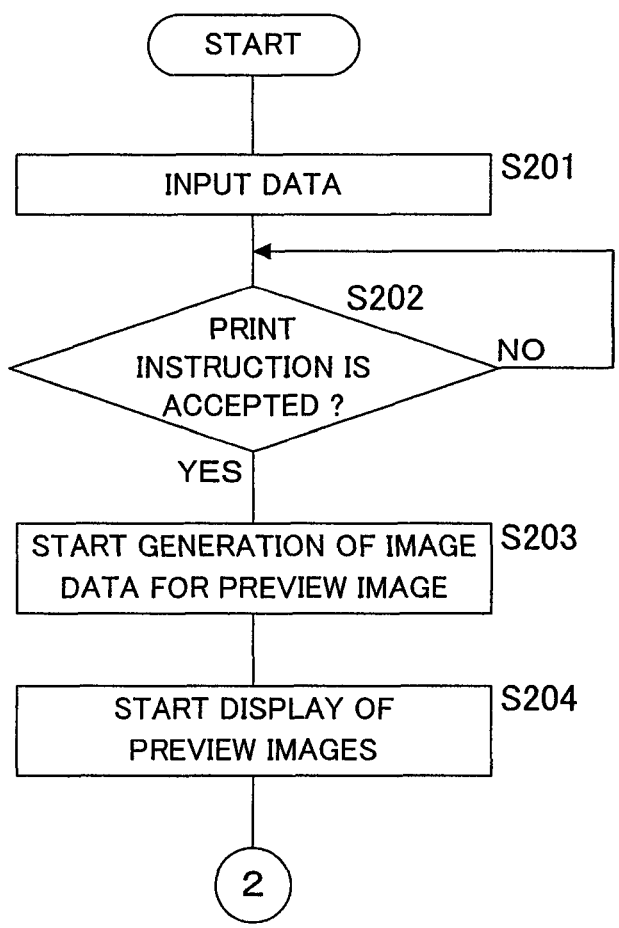
FIG. 8A is a flow chart explaining print of preview images in the personal computer according to Embodiment 1 of the present invention.

FIGS. 8A and 8B are flow charts explaining print of preview images in the personal computer 1 according to Embodiment 1 of the present invention. For convenience of description, a case is explained as an example, in which a document has a plurality of pages, and before the display of all the preview images is completed, the edit of the deletion process is performed and the print of the preview images after edit is performed through the corresponding multi-function machine.

For example, when a user operates the input section 5 of the personal computer 1 to input data, the data is inputted through the input section 5 (Step S201), and a document is created on the application 8.

For example, the "Print" soft key is located in a predetermined position on the screen, and the CPU 2 monitors an operation of the "Print" soft key to determine whether or not the print instruction of the document is accepted based on a signal from the input section 5 and coordinates on the screen of the display 6, etc. (Step S202).

For example, since the "Print" soft key is not operated when the user is still creating the document, the CPU 2 determines that the print instruction of the document is not accepted (Step S202: NO), and waits until the print instruction is accepted.

On the other hand, when the user finishes the creation of the document and gives an instruction to print the document, the CPU 2 determines that the print instruction of the document is accepted (Step S202: YES), and the preview driver 9 is activated.

The preview driver 9 starts the generation, for each page, of the image data for preview image (EMF data) of the document, based on the document data received from the application 8 and the information received from the printer driver 12 (Step S203), and the generated image data is stored in the image data storage section 10. At this time, the preview application 11 is activated and the setting accepting screen is displayed on the display 6.

The image display section 111 starts the preview image display on the display 6 based on the image data for preview image generated by the preview driver 9 with the above-described method (Step S204).

Subsequently, the CPU 2 monitors the edit instruction accepting section 115 of the instruction accepting section 112 to determine whether or not an edit instruction (for example, a instruction of a deletion process) is accepted (Step S205).

When the user operates the "Edit" soft key of the setting accepting screen to select a preview image to be deleted, the edit instruction accepting section 115 accepts the instruction of the deletion process, the CPU 2 determines that the instruction of the deletion process is accepted (Step S205: YES), and the above-described deletion process is executed (Step S211). That is, the CPU 2 gives to the editing section 117 an instruction to edit a preview image selected by the user from the displayed preview images to delete it, and the editing section 117 edits a part of the displayed preview images according to the instruction of the CPU 2, to delete it. The CPU 2 stores the edited data after edit in the RAM 4, and also stores a history showing the details of the deletion process in the RAM 4. At this time, the image display section 111 displays an image based on the edited data on the display 6. Thereafter, the processing proceeds to Step S206.

On the other hand, when the user does not operate the "Edit" soft key of the setting accepting screen and the edit instruction accepting section 115 does not accept the instruction of the deletion process, the CPU 2 determines that the instruction of the deletion process is not accepted (Step S205: NO), and subsequently, determines whether or not the display of all the preview images is completed based on the total number of pages of the document (Step S206).

When the CPU 2 determines that the display of all the preview images is not completed (Step S206: NO), it returns the processing to Step S205.

When the CPU 2 determines that the display of all the preview images is completed (Step S206: YES), it monitors the print confirmation accepting section 116 to determine whether or not a print confirmation for confirming the print of the document corresponding to the preview images displayed before and after edit is accepted (Step S207).

When the CPU 2 determines that the print confirmation is not accepted (Step S207: NO), the CPU 2 waits until it determines that the print confirmation is accepted i.e., until the print confirmation accepting section 116 accepts the print confirmation through the "Print" soft key of the setting accepting screen.

On the other hand, when the CPU 2 determines that the print confirmation is accepted (Step S207: YES), it determines whether or not the deletion process is executed (Step S208). The determination is performed by, for example, referring to the history of the deletion process stored in the RAM 4.

When the CPU 2 determines that the deletion process is executed (Step S208: YES), the print data is generated according to the preview images.

In detail, the CPU 2 gives, to the preview application 11, an instruction to send to the printer driver 12 the EMF data (intermediate file) in which the image data for preview image corresponding to the part of the preview images deleted in the deletion process (hereinafter referred to as image data of the deleted preview image) is deleted.

For example, when the user set printing conditions and post-printing processing conditions after preview images are displayed on the setting accepting screen, the EMF data contains the document data, the metadata for printing the document data, the printing conditions and the post-printing processing conditions.

After the printer driver 12 acquired from the preview application 11 the EMF data in which the image data of the deleted preview image was deleted, it converts the EMF data into print data so that the corresponding multi-function machine recognizes the print data to generate the print data (Step S212). Thereafter, the processing proceeds to Step S210.

On the other hand, when the CPU 2 determines that the deletion process is not executed (Step S208: NO), it gives to the preview application 11 an instruction to send to the printer driver 12 the EMF data (intermediate file) containing the image data for preview image corresponding to all the preview images (hereinafter referred to as the image data of all the preview images).

After the printer driver 12 acquired from the preview application 11 the EMF data containing the image data of all the preview images, the printer driver 12 converts the EMF data containing the image data of all the preview images into print data so that the corresponding multi-function machine recognizes the print data to generate the print data (Step S209).

Subsequently, the printer driver 12 sends the generated print data to the multi-function machine through the communication section 7 (Step S210).

A case is explained as an example below, in which a document is printed by a predetermined multi-function machine before and after the preview image display corresponding to all the pages of the document is completed.

FIG. 9 is a flow chart explaining a print process for preview images in the personal computer 1 according to Embodiment 1 of the present invention. For convenience of description, a case in which a document has a plurality of pages is explained as an example.

For example, when a user operates the input section 5 of the personal computer 1, data is inputted through the input section 5 (Step S301), and a document is created on the application 8.

For example, the "Print" soft key is located in a predetermined position on the screen, and the CPU 2 monitors an operation of the "Print" soft key to determine whether or not a print instruction of the document is accepted (Step S302).

Since the "Print" soft key is not operated when the user is still creating the document, the CPU 2 determines that the print instruction of the document is not accepted (Step S302: NO), and waits until the print instruction is accepted.

On the other hand, when the user finishes the creation of the document and gives an instruction to print the document, the CPU 2 determines that the print instruction of the document is accepted (Step S302: YES), and the preview driver 9 is activated.

The preview driver 9 starts the generation, for each page, of the image data for preview image (EMF data) of the document (Step S303), and the generated image data is stored in the image data storage section 10. At this time, the preview application 11 is activated and the setting accepting screen is displayed on the display 6.

The image display section 111 starts the preview image display on the display 6, based on the image data for preview image generated by the preview driver 9 with the above-described method (Step S304).

For example, when a user operates the "Print" soft key located in the setting accepting screen before the display of all the preview images is completed or after the display of all the preview images is completed, the print confirmation accepting section 116 accepts a print confirmation through the "Print" soft key of the setting accepting screen (Step S305).

At this time, the CPU 2 determines whether or not the display of all the preview images is completed based on the total number of pages of the document (Step S306).

When the CPU 2 determines that the display of all the preview images is not completed (Step S306: NO), it gives to the preview application 11 an instruction to send to the printer driver 12 the image data for preview image which is already generated and is stored in the image data storage section 10 (hereinafter referred to as already-generated image data).

After the printer driver 12 acquired the EMF data containing the already-generated image data from the preview application 11, the printer driver 12 converts the EMF data containing the already-generated image data into print data so that the corresponding multi-function machine recognizes the print data to generate the print data (Step S309). Even since then, as soon as the created image data for preview image is stored in the image data storage section 10, the preview application 11 sends the image data to the printer driver 12. Thereafter, the processing proceeds to Step S308.

On the other hand, when the CPU 2 determines that the display of all the preview images is completed (Step S306: YES), it gives to the preview application 11 an instruction to send all the image data for preview image to the printer driver 12. That is, when the CPU 2 determines that the display of all the preview images is completed, since the generation of the image data for preview image corresponding to all the pages is completed and the image data for preview image is stored in the image data storage section 10, the CPU 2 gives to the preview application 11 an instruction to send to the printer driver 12 the image data for preview image corresponding to all the pages (hereinafter referred to as image data of all the pages).

After the printer driver 12 acquired the EMF data containing the image data of all the pages from the preview application 11, the printer driver 12 converts the EMF data containing the image data of all the pages into print data so that the corresponding multi-function machine recognizes the print data to generate the print data (Step S307).

Subsequently, the printer driver 12 transmits the generated print data to the multi-function machine through the communication section 7 (Step S308).

Therefore, in the data processing apparatus according to the present invention, even before the display of the preview image corresponding to all the pages of the document is completed, the print of the document can be started.

Embodiment 2

Figure 10:
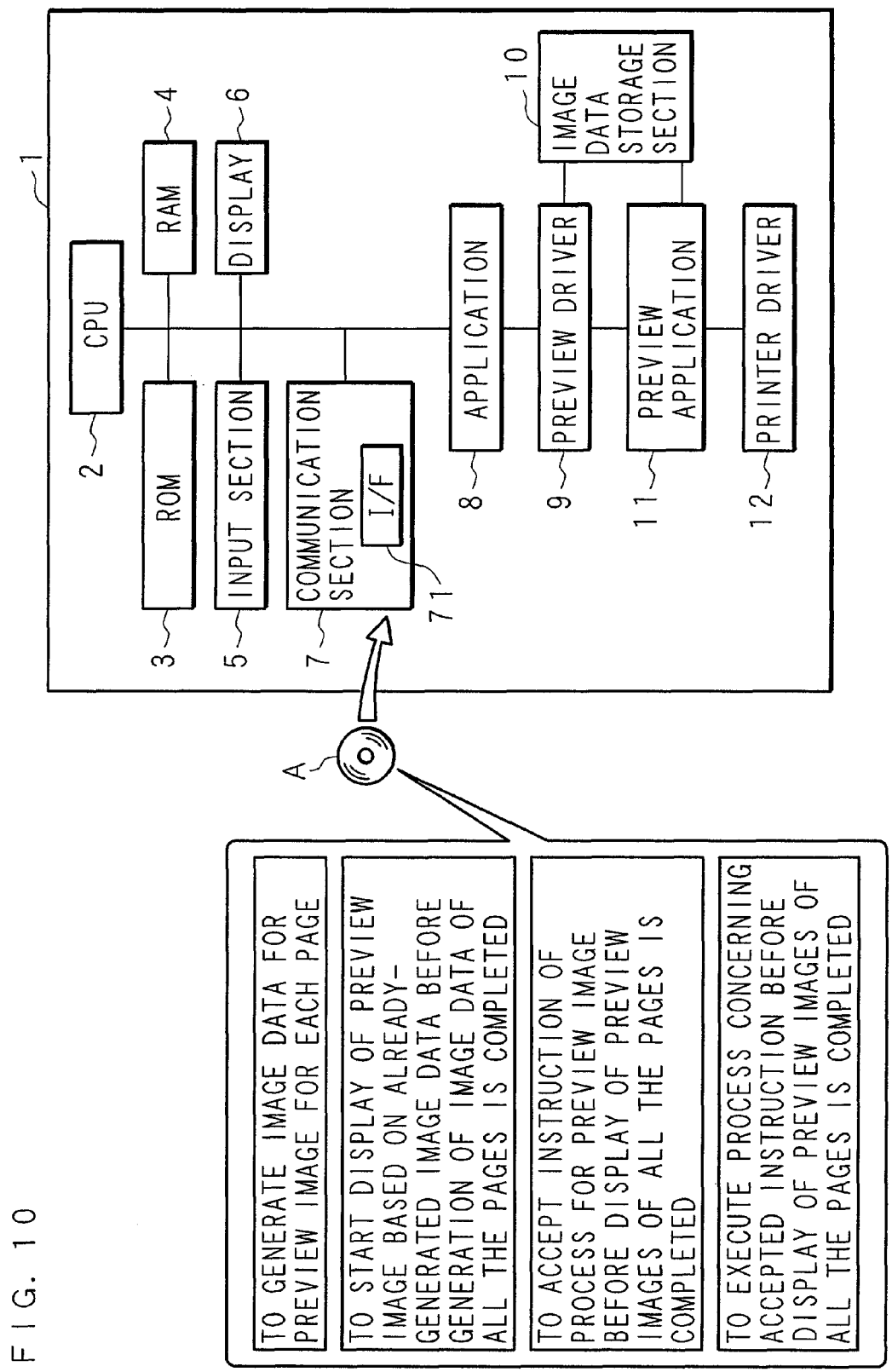
FIG. 10 is a functional block diagram showing an essential configuration of a personal computer according to Embodiment 2 of the present invention.

FIG. 10 is a functional block diagram showing an essential configuration of a personal computer 1 according to Embodiment 2 of the present invention. The personal computer 1 of Embodiment 2 is configured so that a computer program for operating is capable of being provided by a removable recording medium A, such as a CD-ROM, through an I/F 71. Moreover, the personal computer 1 of Embodiment 2 is configured so that the computer program is capable of being downloaded from an external device (not shown) through a communication section 7. The contents will be explained below.

The personal computer 1 of Embodiment 2 comprises an external (or internal) recording medium reader device (not shown). A removable recording medium A, which records a program for generating image data for preview image for each page, starting the preview image display based on the already-generated image data before generation of the image data of all the pages is completed, accepting an instruction of the process for the preview image before the display of the preview images of all the pages is completed, executing a process concerning the accepted instruction before the display of the preview images of all the pages is completed, is inserted into the recording medium reader device, and, for example, a CPU 2 installs the program in a ROM 3. The program is loaded in a RAM 4 and executed. Consequently, it functions as the personal computer 1 of Embodiment 1 of the present invention.

The recording medium may be a so-called program medium, or a medium carrying program codes in a fixed manner, such as tapes including a magnetic tape and a cassette tape, disks including magnetic disks such as a flexible disk and a hard disk, and optical disks such as a CD-ROM, MO, MD, and DVD, cards such as an IC card (including a memory card) and an optical card, or semiconductor memory such as a mask ROM, and EPROM, an EEPROM, and a flash ROM.

Or the recording medium is a recording medium carrying program codes in a flowing manner like downloading the program codes from a network through the communication section 7. In the case where the program is downloaded from a communication network in such a manner, a program for downloading may be stored in the main apparatus in advance, or installed from a different recording medium. Note that the present invention is also implemented in the form of a computer data signal embedded in a carrier wave in which the program codes are embodied by an electric transfer.

The same parts as in Embodiment 1 are designated with the same reference numbers, and detailed explanations thereof will be omitted.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. An image display method for displaying print preview images corresponding to document data, the method comprising:
  generating print preview images, wherein each print preview image corresponds to a respective page of the document data and the document data has a plurality of pages;
  starting to display the print preview images before the print preview images have been generated for all of the plurality of pages of the document data;
  accepting an instruction of a process regarding at least one of the displayed print preview images before the generation of all of the print preview images is completed; and
  executing the process before the generation of all of the print preview images is completed.

2. A data processing apparatus comprising:
  a processor for generating print preview images, wherein each print preview image corresponds to a respective page of document data and the document data has a plurality of pages;
  an image display section configured to start displaying the print preview images before the print preview images have been generated for all of the plurality of pages of the document data; and
  an instruction accepting section configured to accept an instruction of a process regarding at least one of the displayed print preview images before the generation of all of the print preview images is completed,
  wherein the process is executed before the generation of all of the print preview images is completed.

3. The data processing apparatus according to claim 2, wherein the image display section displays the print preview images in the same sequence as the pages of the document data,
  the data processing apparatus further comprises a stop instruction accepting section configured to accept a stop instruction to stop displaying the print preview images before the displaying of all of the print preview images is completed, and wherein
  when the stop instruction accepting section accepts the stop instruction, the image display section stops displaying the next print preview image in the sequence following the print preview image already displayed.

4. The data processing apparatus according to claim 3, further comprising a restart instruction accepting section configured to accept a restart instruction to restart displaying the print preview images when the displaying of the print preview image is stopped, and wherein when the restart instruction accepting section accepts the restart instruction, the image display section restarts displaying the print preview images with the next print preview image in the sequence following the print preview image already displayed.

5. The data processing apparatus according to claim 2, further comprising an edit instruction accepting section configured to accept an edit instruction to edit an already-displayed print preview image before the displaying of all of the print preview images is completed, and wherein a process concerning the edit instruction accepted by the edit instruction accepting section is executed before the displaying of all of the print preview images is completed.

6. The data processing apparatus according to claim 5, further comprising:

a formation instruction accepting section configured to accept an image formation instruction regarding the document data before the displaying of all of the print preview images is completed;

a generating section configured to start image forming data generation based on the generated print preview image when the formation instruction accepting section accepts the image formation instruction; and an output section configured to output the image forming data generated by the generating section.

7. The data processing apparatus according to claim 6, wherein when a plurality of print preview images are already displayed and the edit instruction accepting section accepts an edit instruction to delete parts of already-displayed print preview images, the image display section deletes the parts from the already-displayed print preview images, and the generating section generates image forming data based on the print preview image without the deleted parts of the already-displayed print preview images.

8. A data processing apparatus comprising:

means for generating print preview images, wherein each print preview image corresponds to a respective page of document data and the document data has a plurality of pages;

an image display means to start displaying the print preview images before the print preview images have been generated for all of the plurality of pages of the document data; and an instruction accepting means for accepting an instruction of a process regarding at least one of the displayed print preview images before the generation of all of the print preview images is completed, wherein the process is executed before the generation of all of the print preview images is completed.

9. The data processing apparatus according to claim 8, wherein the image display means displays the print preview images in the same sequence as the pages of the document data, the data processing apparatus further comprises a stop instruction accepting means for accepting a stop instruction to stop displaying the print preview images the displaying of all of the print preview images is completed, and wherein when the stop instruction accepting means accepts the stop instruction, the image display means stops displaying the next print preview image in the sequence following the print preview image already displayed.

10. The data processing apparatus according to claim 9, further comprising restart instruction accepting means for accepting a restart instruction to restart displaying the print preview images when the displaying of the print preview image is stopped, and wherein when the restart instruction accepting means accepts the restart instruction, the image display means restarts displaying the print preview images with the next print preview image in the sequence following the print preview image already displayed.

11. The data processing apparatus according to claim 8, further comprising an edit instruction accepting means for accepting an edit instruction to edit an already-displayed print preview image before the generating all of the print preview images is completed, wherein the edit instruction accepted by the edit instruction accepting means is executed before the generating of all of the print preview images is completed.

12. The data processing apparatus according to claim 11, further comprising:

a formation instruction accepting means for accepting an image formation instruction regarding the document data before displaying of all of the print preview images is completed;

a generating means for starting image forming data generation based on the print preview image when the formation instruction accepting means accepts the image formation instruction; and an output means for outputting the image forming data generated by the generating means.

13. The data processing apparatus according to claim 12, wherein when a plurality of print preview images are already displayed and the edit instruction accepting means accepts an edit instruction to delete parts of already-displayed print preview images, the image display means deletes the parts from the already-displayed print preview images, and the generating means generates image forming data based on the print preview image without the deleted parts of the already-displayed print preview images.

14. A non-transitory computer-readable recording medium in which a computer program for causing a computer to display print preview images corresponding to document data is recorded, said computer program comprising:

generating print preview images, wherein each print preview image corresponds to a respective page of the document data and the document data has a plurality of pages;

starting to display the print preview images before the print preview images have been generated for all of the plurality of pages of the document data;

accepting an instruction of a process regarding at least one of the displayed print preview images before the generation of all of the print preview images is completed; and executing the process before the generation of all of the print preview images is completed.

* * * * *